(12) United States Patent
Xie et al.

(10) Patent No.: US 8,618,238 B2
(45) Date of Patent: Dec. 31, 2013

(54) SHAPE MEMORY EPOXY POLYMERS

(75) Inventors: Tao Xie, Troy, MI (US); Daniel E. Rodak, Southfield, MI (US); William R. Rodgers, Bloomfield Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 544 days.

(21) Appl. No.: 11/867,588

(22) Filed: Oct. 4, 2007

(65) Prior Publication Data

US 2008/0262188 A1     Oct. 23, 2008

Related U.S. Application Data

(60) Provisional application No. 60/925,418, filed on Apr. 20, 2007.

(51) Int. Cl.
*C08G 65/14* (2006.01)

(52) U.S. Cl.
USPC .......................................................... 528/98

(58) Field of Classification Search
USPC .......................................................... 528/98
See application file for complete search history.

(56) References Cited

U.S. PATENT DOCUMENTS

| | | | |
|---|---|---|---|
| 3,784,647 A * | 1/1974 | Fleming et al. | 525/523 |
| 4,552,933 A * | 11/1985 | Sellstrom et al. | 525/454 |
| 4,882,399 A * | 11/1989 | Tesoro et al. | 525/523 |
| 5,002,818 A | 3/1991 | Licari et al. | |
| 5,057,558 A * | 10/1991 | Chung et al. | 523/414 |
| 5,672,402 A | 9/1997 | Kreckel et al. | |
| 5,755,913 A | 5/1998 | Liaw et al. | |
| 5,916,008 A | 6/1999 | Wong | |
| 5,969,006 A * | 10/1999 | Onan et al. | 523/166 |
| 6,156,842 A | 12/2000 | Hoenig et al. | |
| 6,589,892 B1 | 7/2003 | Smith et al. | |
| 6,692,807 B2 | 2/2004 | Bries et al. | |
| 6,759,481 B2 | 7/2004 | Tong | |
| 6,773,535 B1 | 8/2004 | Wetzel | |
| 6,793,026 B1 | 9/2004 | De Fazio | |
| 6,827,325 B2 | 12/2004 | Hofmann et al. | |
| 6,986,855 B1 | 1/2006 | Hood et al. | |
| 7,188,498 B2 | 3/2007 | Browne et al. | |
| 7,762,362 B2 | 7/2010 | Cutkosky et al. | |
| 2001/0047579 A1 | 12/2001 | Lee et al. | |
| 2005/0151385 A1 | 7/2005 | Autumn et al. | |
| 2005/0167556 A1 | 8/2005 | Fontana et al. | |
| 2005/0179167 A1* | 8/2005 | Hachikian | 264/271.1 |
| 2005/0240190 A1 | 10/2005 | Gall et al. | |
| 2005/0274455 A1 | 12/2005 | Extrand | |
| 2006/0036045 A1 | 2/2006 | Wilson et al. | |
| 2006/0156535 A1 | 7/2006 | Browne et al. | |

(Continued)

FOREIGN PATENT DOCUMENTS

| | | | | |
|---|---|---|---|---|
| CN | 101100545 A | | 1/2008 | |
| JP | 05202334 | * | 8/1993 | ........... C09D 163/00 |
| JP | 2003073453 | * | 3/2003 | ............. C08G 59/22 |

OTHER PUBLICATIONS (Handbook of Epoxy, McGraw-Hill, 1982, p. 7-26).*

(Continued)

*Primary Examiner* — Shane Fang
(74) *Attorney, Agent, or Firm* — BrooksGroup

(57) ABSTRACT

One embodiment includes compositions of shape memory epoxy polymers.

24 Claims, 6 Drawing Sheets

EPON 826 (n=0.085)

Jeffamine D-230 (n=2.69)

NGDE

(56) References Cited

U.S. PATENT DOCUMENTS

| | | |
|---|---|---|
| 2006/0188706 A1 | 8/2006 | Kobayashi et al. |
| 2007/0023137 A1 | 2/2007 | Merz |
| 2007/0073130 A1 | 3/2007 | Finch et al. |
| 2007/0289786 A1 | 12/2007 | Cutkosky et al. |
| 2008/0269420 A1 | 10/2008 | Tong et al. |

OTHER PUBLICATIONS

Huntsman (Jaffamine D-230, product bulletin, 1988).*
Nelson et al., Shape Recovery of Nanoscale Imprints in a Thermoset "Shape Memory" Polymer, Applied Physics Letters, 2005, 86, 103108.
Lendlein et al., Shape-Memory Polymers, Angewandte Chem. Int. Ed., 2002, pp. 2034-2057, vol. 41.
Xie et al., Self-Peeling Reversible Dry Adhesive System, Chem. Mater., 2008, pp. 2866-2868, vol. 20.
Liu et al., Chemically Cross-Linked Polycyclooctene: Synthesis, Characterization and Shape Memory Behavior, Macromolecules, 2002. pp. 9868-9874, vol. 35.
Lendlein et al., Biodegradable, Elastic Shape-Memory Polymers for Potential Biomedical Applications, Science, May 31, 2002, pp. 1673-1676, vol. 296.
Lee et al., Structure and Thermomechanical Properties of Polyurethane Block Copolymers with Shape Memory Effect, Macromolecules, 2001, pp. 6431-6437, vol. 34.
Lin et al., Study on Shape-Memory Behavior of Polyether-Based Polyurethanes. I. Influence of the Hard-Segment Content, J. of Applied Polymer Science, 1998, pp. 1563-1574, V.69.
Lin et al., Study on Shape-Memory Behavior of Polyether-Based Polyurethanes. II. Influence of Soft-Segment Molecular Weight, J. of App. Polymer Science, 1998, pp. 1575-1586, 69.
EPON Resin 828 Structural Reference Manual, Shell Chemicals, Houston, TX.
Gall et al., Shape Memory Polymer Nanocomposites, Acta Materialia, 2002, pp. 5115-5126, vol. 50.
Gall et al., Internal Stress Storage in Shape Memory Polymer Nanocomposites, Applied Physics Letter, Jul. 12, 2004, pp. 290-292, vol. 85, No. 2.
Xu et al., Synthesis and Shape Memory Effects of Si—O—Si Cross-Linked Hybrid Polyurethanes, Polymer, 2006, pp. 457-465, vol. 47.
Crystallisation of Liquid DGEBPA and DGEBPF Epoxy Resins, Resolution Performance Products, Product Bulletin, SC:2365-01, Jul. 2001.
Jeffamine D-230 Polyetheramine, Technical Bulletin, Huntsman Corporation, Copyright 2006.
Xie et al., Self-Peeling Reversible Dry Adhesive System, Materials, & Processes Laboratory, General Motors Research & Development Center, Chem. Mater. 2008,vol. 20, pp. 2866-2.
Aubert et al., Thermally Removable Epoxy Adhesives Incorporating Thermally Reversible Diels-Alder Adducts, The Journal of Adhesion, 2003, vol. 79, pp. 609-616.
International Search Report and Written Opinion, International Application No. PCT/US/2008/060796 Filed Apr. 18 2008, Appicant GM Global Technology Operations, Inc.
Unver et al., Geckbot: A Gecko Inspired Climbing Robot Using Elastomer Adhesives.
Daltorio et al., A Small Wall-Walking Robot with Compliant, Adhesive, Feet, IEEE/RSJ International Conference on Intelligent Robots and Systems, 2005, pp. 4018-4023.
International Search Report and Written Opinon, International Application No. PCT/US2008/060826 filed Apr. 18, 2008, Applicant GM Global Technology Operations, Inc.
Lee et al., A Reversible Wet/Dry Adhesive Inspired by Mussels and Geckos, Nature, Jul. 19, 2007, pp. 338-342, vol. 448.
Lee et al., Single-Molecule Mechanics of Mussel Adhesion, PNAS, Aug. 29, 2005, pp. 12999-13—3, vol. 103, No. 35.
Veriflex Shape Memory Polymer, http://www.crgrp.net/veriflex.shtml, Cornerstone Research Group, Inc., 2003-2007.
Shape Memory Polymer, http://crgnp.net/success-stories.shtml, Cornerstone Research Group, Inc., 2003-2007.
Tembo Shape Memory Polymers and Elastic Memory Composite (EMC) Material, http://www.ctd-materials.com/products/emc.htm, Cornerstone Research Group, Inc., 2003-2007.
Behl et al., Shape-Memory Polymers: Dual Shape Materials for Bio-medical Applications, A. Mater. Today, 2007, vol. 10, pp. 1-20.
Bellin et al., Polymeric Triple-Shape Materials, PNAS, Nov. 28, 2006, vol. 103, No. 48, pp. 18043-18047.
Chung et al., Two-Way Reversible Shape Memory in a Semicrystalline Network, Macromolecules, 2008, vol. 41, pp. 184-192.
Rousseau et al., Shape Memory Effect Exhibited by Smectic-C Liquid Crystalline Elastomers, J. Am. Chem. Soc., 2003, vol. 125, pp. 15300-15301.
Liu et al., Review of Progress in Shape-Memory Polymers, Journal of Materials Chemistry, 2007, vol. 17, pp. 1543-1558.
Dietsch et al., A Review—Features and Benefits of Shape Memory Polymers (SMPs), Journal of Advanced Materials, Apr. 2007, vol. 39, No. 2, pp. 3-12.
Li et al., Shape Memory Effect of Ethylene—Vinyl Acetate Copolymers, Journal of Applied Polymer Science, 1999, vol. 71, pp. 1063-1070.
Liu et al., Novel Shape-Memory Polymer with Two Transition Temperatures, Macromol. Rapid Commun., 2005, vol. 26, pp. 649-652.
Reyntjens et al., Polymer Networks Containign Crystallizable Poly(octadecyl vinyl ether) Segments for Shape-Memory Materials, Macromol. Rapid Commun., 1999, vol. 20,pp. 251-255.
Jiang et al., Polymers Move in Response to Light, Advanced Materials., 2006, vol. 18, pp. 1471-1475.
Huang et al., Water-Driven Programmable Polyurethane Shape Memory Polymer: Demonstration and Mechanism, Applied Physical Letters, 2005, vol. 86, pp. 114105-1—3.
Lendlein et al., Light-Induced Shape-Memory Polymers, Nature, Apr. 14, 2005, vol. 434, pp. 879-882.
Goethals et al., Poly(vinyl ethers) as Building Blocks for New Materials, Macromol. Symp. 1998, vol. 132, pp. 57-64.
Xiao, U.S. Appl. No. 12/273,083, Self-Healing and Scratch Resistant Shape Memory Polymer System, filed Nov. 18, 2008.
Xie, U.S. Appl. No. 11/867,531, Reversible Dry Adhesives, filed Oct. 4, 2007.
Xie, U.S. Appl. No. 12/396,045, Polymer Systems with Multiple Shape Memory Effect, filed Mar. 2, 2009.
Xie, U.S. Appl. No. 12/367,826, A Reversible Welding Process for Polymers, filed Feb. 9, 2009.
Xie, U.S. Appl. No. 12/178,844, High Strength Reversible Noncovalent Adhesion Methods for a Solid Polymer-Polymer Interface, filed Jul. 24, 2008.
Cheng, U.S. Appl. No. 12/359,709, Remote Activation of Thermo-Reversible Dry Adhesives, filed Jan. 26, 2009.
Xie, U.S. Appl. No. 12/423,947, Shape Memory Polymer and Adhesive Combination and Methods of Making and Using the Same, filed Apr. 15, 2009.
Xie, U.S. Appl. No. 12/432,211, Shape Memor Polymers with Surface Having Dangling Adhesive Polymeric Chains and Methods of Making and Using the Same, filed Apr. 29, 2009.
Xie, U.S. Appl. No. 12/181,562, Polymer Systems with Multiple Shape Memory Effect, filed Jul. 29, 2008.
Xie, U.S. Appl. No. 11/867,549, Method of Miniimizing Residue Adhesion for Thermo-Reversible Dry Adhesives, filed Oct. 4, 2007.
Xie, U.S. Appl. No. 12/105,865, Attachment Pad with Thermal Reversible Adhesive and Methods of Making and Using the Same, filed Apr. 18, 2008.
Xie, U.S. Appl. No. 11/867,558, Multilayer Adhesive for Thermal Reversible Joining of Substrates, filed Oct. 4, 2007.
Xie, U.S. Appl. No. 12/391,704, Reversible Dry Adhesives for Wet adn Dry Conditions, filed Feb. 24, 2009.
Xie, U.S. Appl. No. 12/105,749, Method for Robotic Handling Using Thermo-Reversible Dry Adhesives, filed Apr. 18, 2008.
Xie, U.S. Appl. No. 12/105,788, Climbing Devices Based on Thermo-Reversible Dry Adhesives, filed Apr. 18, 2008.
Xie, U.S. Appl. No. 10/042,007, Shape Memory Epoxy Polymers, filed Oct. 4, 2007.

(56) References Cited

OTHER PUBLICATIONS

Geckobot: A Gecko Inspired Climbing Robot Using Elastomer Adhesives (Abstract), Robotics and Automation, 2006. ICRA 2006. Proceedings 2006 IEEE International Conference on Publication Date May 15-19, 2006 Unver, O., Uneri, A., Aydemir, A., Sitti, M. Dept. of Mech. Eng. Carnegie Mellon Univ., Pittsburgh, PA.

Unver, O., Geckobot: A gecko inspired climbing robot using elastomer adhesives, Robotics and Automation, 2006, ICRA 2006. Proceedings 2006 IEEE International, Publication Date: May 15-19, 2006, Abstract.

Shell Chemical, EPON Resin 828, On-line literature, Oct. 10, 1999, 8 sheets.

PCT/US2008/060826 Written Opinion and Search Report; Mailed: Jun. 30, 2008; 9 pages.

About Foam; Copyright 2005 Foam Rubber Discount Company; 3 pages.

Daltorio et al., A Small Wall-Walking Robot with Compliant, Adhesive Feet; 2005 IEEE/RSJ International Conference on Intelligent Robots and Systems; pp. 4018-4023.

\* cited by examiner

EPON 826 (n=0.085)

Jeffamine D-230 (n=2.69)

NGDE

EPON 826 (n=0.085)

Jeffamine D-230 (n=2.69)

Decylamine

SHAPE MEMORY EPOXY POLYMERS

This application claims the benefit of U.S. Provisional Application No. 60/925,418, filed Apr. 20, 2007.

FIELD OF THE INVENTION

The field to which the disclosure generally relates includes compositions of shape memory polymers.

BACKGROUND

Shape memory materials have been known for over half a century. Thermoresponsive shape memory polymers (SMP's), in particular, have attracted great interest due to their large strain recovery capability (up to 800%), much greater than what is achievable with shape memory alloys (SMA's) with maximum strain recovery below 8%. Besides the large strain recovery ability, SMP's hold other advantages over SMA's including light weight, excellent processability, and low cost.

For a polymer to possess shape memory properties, it has to have a frozen phase and a reversible phase. The former is responsible for memorizing the original shape and is usually achieved via chemical cross-linking or physical cross-linking (e.g., chain entanglement and crystallization). The fixing and change of temporary shapes, on the other hand, are due to the reversible phase, which can be either a glass transition or a melting transition. Since most polymers possess a glass transition temperature ($T_g$) or a melting temperature ($T_m$) or both, they can be converted into SMP's by introducing a freezing mechanism (e.g. chemical cross-linking). The ample opportunities to create and tailor the shape memory properties of SMP's through molecular design are exemplified by the variety of SMP's discovered and the wide range of $T_g$ (from −30 to +70° C.) obtainable with polyurethane SMP's.

Owing to their superior mechanical properties, ease of processing, excellent chemical resistance, and good adhesion to a wide range of substrates, epoxy based polymers have been widely used as structure, coating, and adhesive materials in real world applications.

SUMMARY OF EXEMPLARY EMBODIMENTS OF THE INVENTION

One embodiment of the invention includes a composition comprising an aromatic diepoxide (rigid epoxy), an aliphatic diepoxy (flexible epoxy), and a diamine curing agent. Another embodiment of the invention includes a method comprising providing a shape memory polymer (SMP) comprising reacting an aromatic diepoxide (rigid epoxy), an aliphatic diepoxy (flexible epoxy), and a diamine curing agent.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

One embodiment of the invention includes a composition comprising an aromatic diepoxide (rigid epoxy), an aliphatic diepoxy (flexible epoxy), and a diamine curing agent. In one embodiment, while keeping the total number of epoxide at twice the total number of amine groups, the mole ratio between the rigid epoxy to the flexible epoxy may be anywhere from 0 to infinity. Another embodiment of the invention includes a method comprising providing a shape memory polymer (SMP) comprising reacting an aromatic diepoxide (rigid epoxy), an aliphatic diepoxy (flexible epoxy), and a diamine curing agent.

Figure 1:
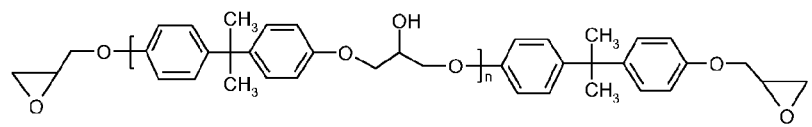
FIG. 1 illustrates the chemical structures of EPON 826, Jeffamine D-230, and NGDE.
Figure 1:
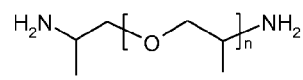
Figure 1:
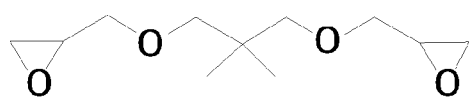

In one embodiment, a series of epoxy shape memory polymers formulated with aromatic/aliphatic diepoxides and an aliphatic diamine were synthesized. The shape memory polymers were prepared in the following manner. The structures of the chemicals used in the method are shown in FIG. 1. The diglycidyl ether of bisphenol A epoxy monomer, EPON 826, and the curing agent poly(propylene glycol)bis(2-aminopropyl)ether, Jeffamine D-230, were available from Hexion Specialty Chemicals and Huntsman, respectively. EPON 826 has an approximate epoxy equivalent weight of 180. Jeffamine D-230 is a polyetheramine that is difunctional, primary amine with an average molecular weight of about 230. The primary amine groups are located on secondary carbons at the end of the aliphatic polyether chain. Neopentyl glycol diglycidyl ether, NGDE, was manufactured by TCI America and has a molecular weight of about 216. EPON 826 was weighed into a glass bottle and placed into an oven preset at 70° C. to melt. Immediately after the bottle containing the EPON 826 was taken out of the oven, weighed Jeffamine D-230 and NGDE were added to the bottle. The bottle was then shaken vigorously by hand for about ten seconds to mix the components. The detailed formulations of the five epoxy SMP samples prepared according to the method are summarized in Table 1.

TABLE 1

Formulations of epoxy samples 1-5

| Sample # | EPON 826 (mole) | NGDE (mole) | Jeffamine D-230 (mole) |
|---|---|---|---|
| 1 | 0 | 0.02 | 0.01 |
| 2 | 0.005 | 0.015 | 0.01 |
| 3 | 0.01 | 0.01 | 0.01 |
| 4 | 0.015 | 0.005 | 0.01 |
| 5 | 0.02 | 0 | 0.01 |

Next, the mixture was poured into an aluminum pan. The epoxy samples were thermally cured at 100° C. for 1.5 hours and postcured at 130° C. for 1 hour. Upon the completion of the cure, the epoxy samples were demolded and cut into rectangular shapes for DMA and shape recovery experiments.

The glass transition temperature of a polymer, which is the shape recovery temperature for a glassy thermoset SMP, is closely related to its chain mobility. The chain mobility of polymers is affected by the chain flexibility. In most cases, polymers with more chain flexibility tend to have lower glass transition temperatures. Altering chain flexibility thus allows for adjusting glass transition temperatures of polymers.

In one embodiment, the base formulation, sample 5 in Table 1, consists of only EPON 826 and Jeffamine D-230. EPON 826 is an aromatic diepoxide, with the aromatic rings being rigid in nature. To tailor the glass transition temperatures ($T_g$'s) of the epoxy system, EPON 826 was systematically replaced by NGDE, a flexible aliphatic diepoxide, while keeping the total number of epoxide at twice the number of amine. This is shown in the formulations of samples 1-5 in Table 1. A total of 5 samples were prepared, wherein sample 1 contained an aliphatic diepoxide (NGDE) but no aromatic diepoxide (EPON 826), and sample 5 contained an aromatic diepoxide (EPON 826) but no aliphatic diepoxide (NGDE). Substituting EPON 826 with NGDE increases the crosslink density because the epoxy equivalent weight of NGDE, which is 108, is lower than the epoxy equivalent weight of EPON 826, which is about 180.

Figure 2:
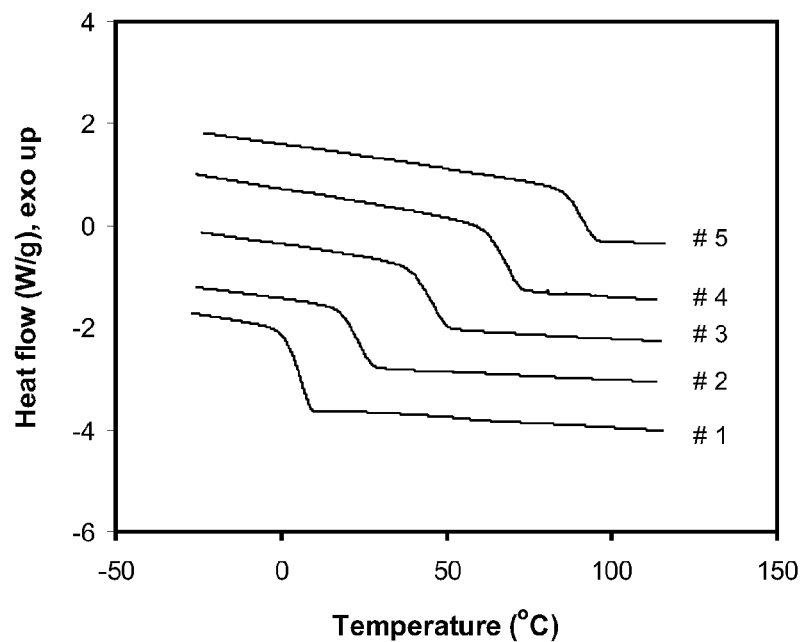
FIG. 2 illustrates differential scanning calorimetry (DSC) curves for five cured epoxy samples corresponding to the chemical compositions listed in Table 1.

The differential scanning calorimetry (DSC) curves for all five samples are shown in FIG. 2. The DSC measurements were made under nitrogen using a DSC Q1000 (TA instruments) at a heating rate of 10° C. min$^{-1}$. Referring to FIG. 2, it is evident that all the samples possess very sharp and distinctive glass transitions and that the introduction of NGDE leads to epoxy polymers with lower $T_g$'s from 6° C. to 88° C. In various embodiments, sharp glass transitions may be a desirable attribute for SMP materials.

Figure 3:
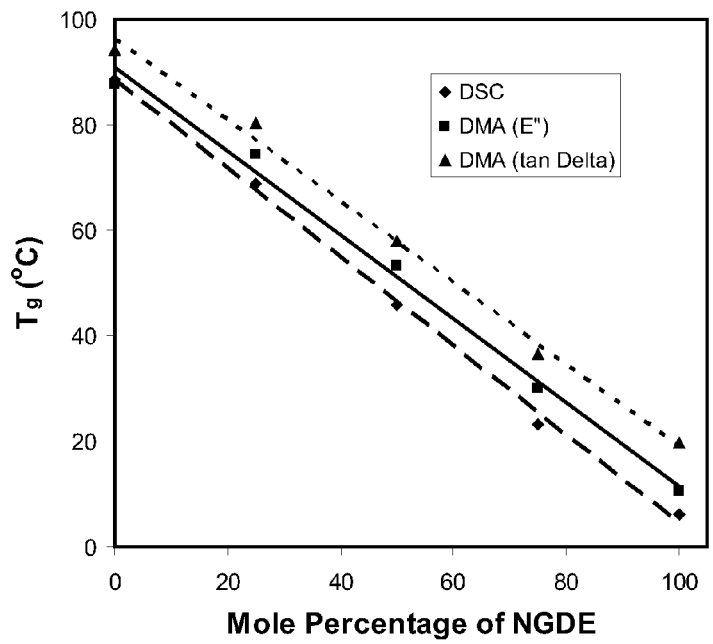
FIG. 3 illustrates glass transition temperatures obtained from three methods (DSC, DMA (E"), and DMA (tan δ)) versus mole percentage of NGDE.

The five samples were further evaluated using dynamic mechanical analysis (DMA) to obtain the $T_g$ (E") (from the loss modulus peak) and $T_g$ (tan δ). The DMA experiments were conducted in a dual cantilever mode using a DMA Q800 (TA Instruments, Inc.) and the testing parameters were: constant frequency=1 Hz; oscillation amplitude=30 μm; heating rate=5° C. min$^{-1}$. The $T_g$'s obtained from the three methods (DSC, DMA (E"), and DMA (tan δ)) are plotted in FIG. 3 against the mole percentage of NGDE in the formulation. Referring to FIG. 3, a linear reduction of $T_g$ with the increase of the mole percentage of NGDE in the formulation indicates that any $T_g$ in the entire temperature range can be obtained.

As noted, replacing EPON 826 with NGDE raises the crosslink density, which by itself would increase the material rigidity. On the other hand, the flexible nature of the aliphatic NGDE would increase the chain flexibility. The results shown in FIG. 3 suggest that the impact of increasing the crosslink density by introducing NGDE is more than compensated for by the increase in chain flexibility, resulting in a net reduction in $T_g$. The thermomechanical characterization using DMA reveals that these epoxy polymers possess $T_g$ transitions ranging from 20° C. to 94° C. (DMA tan δ). The $T_g$'s of these polymers were found to decrease linearly with the mole percentages of the aliphatic diepoxide, suggesting that a material with any $T_g$ in this temperature range can be obtained.

Figure 4:
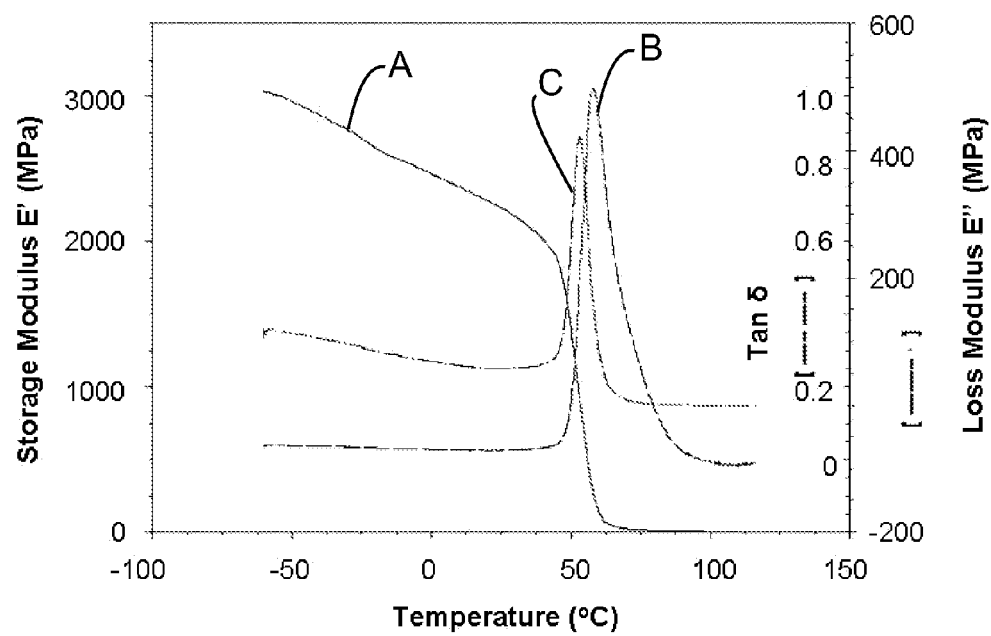
FIG. 4 illustrates DMA curves for sample 3.

Referring to FIG. 4, the DMA curves ($T_g$ (E") and $T_g$ (tan δ)) are shown for sample 3. Line A is the storage modulus E' curve, line B is the tan δ curve, and line C is the loss modulus E" curve. The change of storage modulus before and after its glass transition is approximately 2 orders of magnitude, similar to all the other samples (their DMA curves not shown here). Qualitatively, the glass transition occurs within a relatively narrow temperature range, based on the rapid decrease of storage modulus and the sharpness of the tan δ and loss modulus peaks. Quantitatively, the narrowness of the glass transition can be defined as the difference between the $T_g$ (tan δ) and the $T_g$ (E"). The narrowness of the glass transition is about 7° C. for sample 3, and is about the same for the other epoxy samples 1-2 and 4-5 not shown in FIG. 4. Such narrow glass transitions may be due to the structural homogeneity of the cured polymers, resulting from the well-defined chain length of components used in the formulation and the low viscosities of the precured mixtures. The narrowness of the transition is non-trivial; it translates into the temperature sensitivity of material mechanical properties around the $T_g$. Practically, an SMP with a narrower $T_g$ transition means that the shape recovery can be accomplished at a temperature closer to its $T_g$. To further explain the benefits of a narrow $T_g$ transition, the circumstance for a specific SMP application will have to be taken into account. For instance, if an SMP is used in an application that requires multi shape change cycles, a recovery temperature closer to the $T_g$ will benefit the material durability by minimizing the material thermal degradation as the result of repeated heating to a lower recovery temperature. In various embodiments, the narrowness of the $T_g$ transition can be quite beneficial for commercial applications.

All the epoxy shape memory polymer samples with $T_g$'s above room temperature showed shape memory properties. Among samples 1 through 5, sample 1 had a $T_g$ lower than room temperature and thus was not suitable for use as an SMP above room temperature. Samples 2-5 all showed shape fixing and recovery capability. For the shape recovery experiments, sample 3 with an original rectangular shape was immersed in a 70° C. hot water bath for 6 seconds. It was deformed by hand immediately after it was taken out of the hot water bath. With the load maintained on the deformed sample 3, it was quickly dipped in a cold water bath (20° C.) to fix the temporary shape. For shape recovery, the sample with the fixed temporary shape was immersed back into the hot water bath. The shape recovery experiments for the samples 2 and 4 were attempted in the same fashion except the temperatures of the hot water bath were 60° C. and 78° C., respectively. For sample 5, the heating was conducted in a hot oven at 110° C. and the heating time was 15 minutes.

Figure 5A:
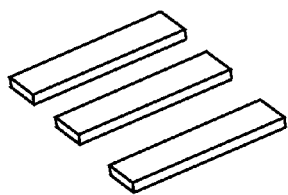
FIG. 5A illustrates original rectangular shapes of a sample according to one embodiment.
Figure 5B:
FIG. 5B illustrates temporary deformed shapes of a sample according to one embodiment.
Figure 5C:
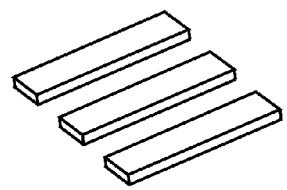
FIG. 5C illustrates recovered rectangular shapes of a sample according to one embodiment.

Referring to FIGS. 5A, 5B, and 5C, the shape change and recovery for sample 3 are illustrated. Starting from the original (permanent) rectangular shapes shown in FIG. 5A, sample 3 can be deformed into very complex shapes by twisting and bending. Upon cooling under load, these deformed shapes were fixed as shown in FIG. 5B. Upon immersing in a 70° C. water bath, all the temporary shapes recovered to the original rectangular shapes as shown in FIG. 5C in about 6 seconds. Qualitatively, the recovered shapes were indistinguishable from the original shapes, revealing the good shape memory properties of sample 3.

Figure 6:
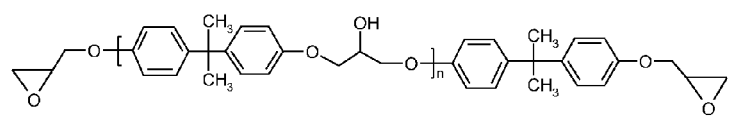
FIG. 6 illustrates the chemical structures of EPON 826, Jeffamine D-230, and decylamine.
Figure 6:
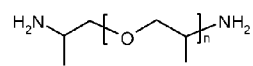
Figure 6:
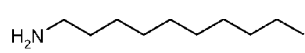

In another embodiment, a series of epoxy amine shape memory polymers with various crosslink densities were synthesized in the following manner. The structures of the chemicals used are shown in FIG. 6. EPON 826 and Jeffamine D-230 were obtained from Hexion and Huntsman, respectively. Decylamine was purchased from Aldrich. All chemicals were used as received.

The epoxy formulations for samples 6-11 are given in Table 2 below. For each sample, 0.02 mole of EPON 826 was weighed into a glass bottle, which was placed into an oven preset at 75° C. and kept there for half an hour. Immediately after the bottle containing EPON 826 was taken out of the oven, Jeffamine D-230 and decylamine were introduced into the bottle according to the amounts specified in Table 2. The bottle was then shaken vigorously by hand for about ten seconds to mix the components and the mixture was poured into an aluminum pan. All epoxy samples were thermally cured at 100° C. for 16 hours. In other embodiments, different curing conditions may be used to yield the same results. Upon the completion of the cure, the epoxy samples were demolded and cut into rectangular strips (40×12×2 mm) for DMA and shape recovery analysis.

TABLE 2

Formulations of epoxy samples 6-11

| Sample # | EPON 826 (mole) | Jeffamine D-230 (mole) | decylamine (mole) |
|---|---|---|---|
| 6 | 0.02 | 0.01 | 0 |
| 7 | 0.02 | 0.0075 | 0.005 |
| 8 | 0.02 | 0.005 | 0.01 |
| 9 | 0.02 | 0.0025 | 0.015 |
| 10 | 0.02 | 0.0005 | 0.019 |
| 11 | 0.02 | 0 | 0.02 |

Many cured epoxy resins are thermoset materials with a $T_g$ transition. However, the $T_g$'s for typical epoxy systems are usually above 100° C., and therefore are not suitable for use as practical shape memory polymers at lower temperatures. The $T_g$ of an epoxy system can be adjusted by changing the crosslink density. In various embodiments of the invention, to formulate a practical epoxy SMP, the $T_g$ is lowered by reducing the crosslink density. For an epoxy amine system, a facile way to do that is to replace part of the diamine crosslinker with a monoamine.

In one embodiment, the system consists of EPON 826, Jeffamine D-230 as the crosslinker, and decylamine as the monoamine. As shown in Table 2, from sample 6 to 11, the fraction of the crosslinker is systematically reduced, while the total amounts of epoxy functionality and active hydrogen functionality on the amines are maintained equal. Among these samples, sample 11 was used as a reference sample because it contains no crosslinker and is not expected to possess shape memory properties.

Figure 7:
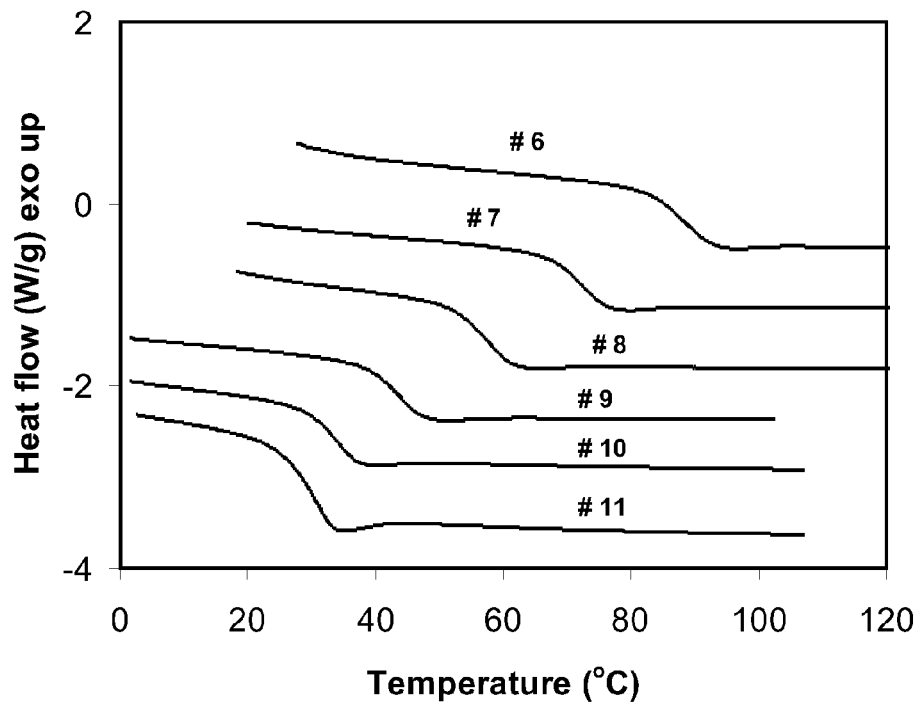
FIG. 7 illustrates DSC curves for samples 6-11 with chemical compositions listed in Table 2.
Figure 8:
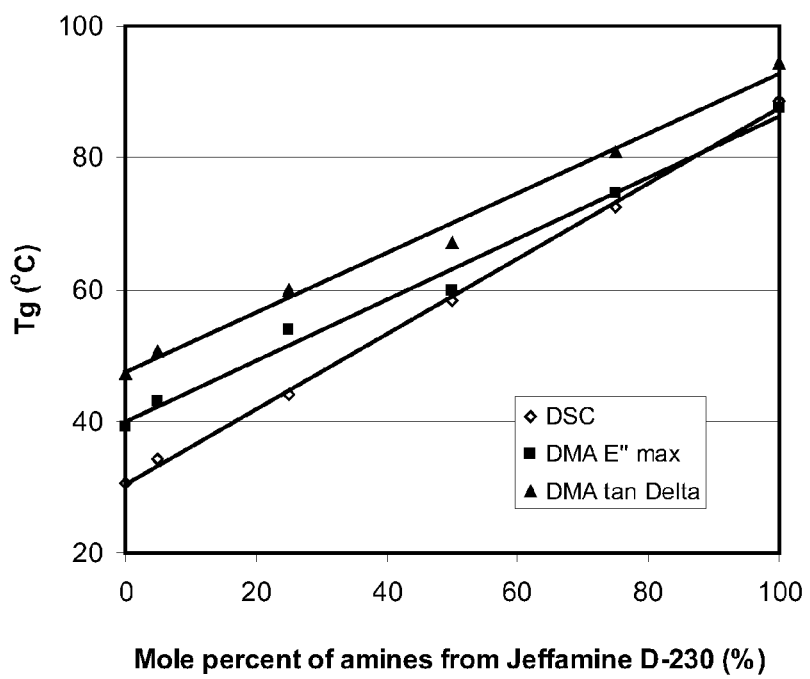
FIG. 8 illustrates glass transition temperature versus mole percentage of amines from Jeffamine D-230.

The DSC measurements and DMA experiments were conducted in the same manner as described for samples 1-5 above. All the cured samples 6-11 were subjected to DSC measurement and the results are shown in FIG. 7. As shown in FIG. 7, all the samples 6-11 had distinctive glass transitions, ranging from 30° C. to 88° C., which is within the range of interest for typical SMP applications. The samples 6-11 were further evaluated by DMA and the corresponding $T_g$ (E") (from the loss modulus peak) and $T_g$ (tan δ) were obtained. The $T_g$'s obtained from the three methods (DSC, DMA (E"), and DMA tan δ) are plotted in FIG. 8 against the mole percentage of amine in the crosslinker of the formulation. In FIG. 8, the $T_g$'s are linearly proportional to the mole percentage of amine in the crosslinker of the formulation, indicating that a material with any $T_g$ in this temperature range can be obtained. The $T_g$'s (DMA E" max) range from approximately 40° C. to 86° C.

Figure 9:
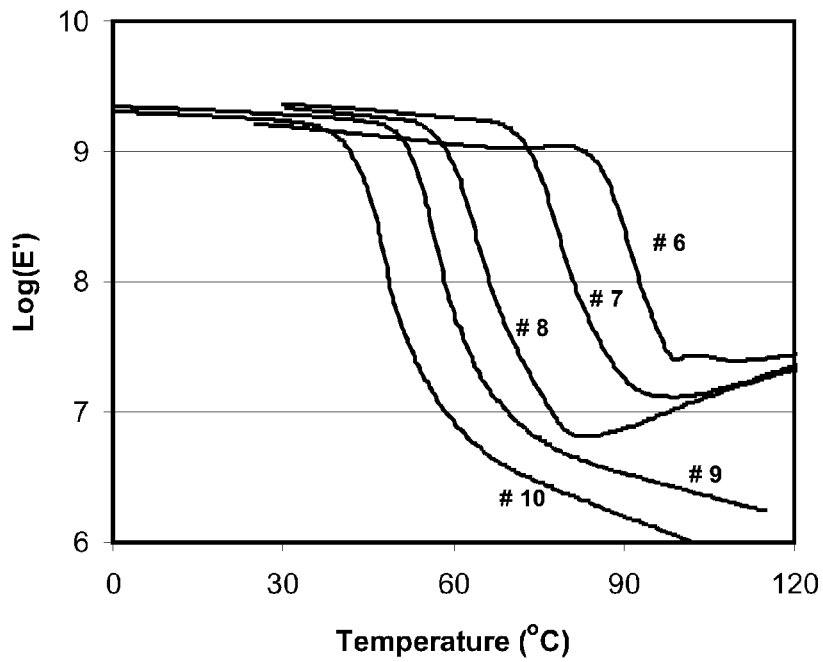
FIG. 9 illustrates storage modulus versus temperature for samples 6-10.

The storage modulus versus temperature curves for samples 6 through 10 are shown in FIG. 9. The changes of storage modulus before and after their glass transitions are approximately 2 orders of magnitude for all the samples. A closer examination of all the curves in FIG. 9 shows that the magnitude of such a change increases with the reduction of crosslink density. Qualitatively, this observation is consistent with the theory of rubber elasticity that the storage modulus for a thermoset system above its glass transition is linearly proportional to the crosslink density.

Figure 10:
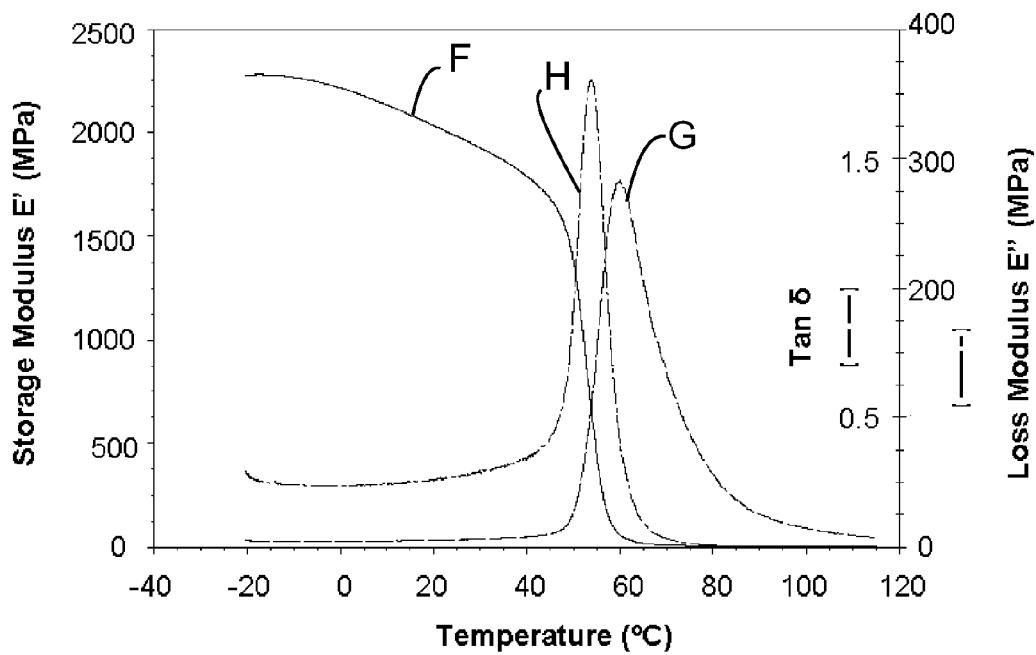
FIG. 10 illustrates DMA curves for sample 9.

The storage modulus, $T_g$ (E"), and $T_g$ (tan δ) curves for sample 9 are plotted in FIG. 10. Line F is the storage modulus E' curve, line G is the tan δ curve, and line H is the loss modulus E" curve. Qualitatively, the glass transition occurs within a relatively narrow temperature range, based on the rapid decrease of storage modulus and the sharpness of the tan δ and loss modulus peaks. Quantitatively, the narrowness of the $T_g$ transition is about 7° C. for sample 9 and is about the same for samples 6-8 and 10-11 (not shown in FIG. 10).

In another embodiment, the epoxy samples 6-11 were deformed and the shape recovery was attempted according to following procedure. Sample 9 with an original rectangular shape (40×12×2 mm) was immersed in a 65° C. hot water bath for 10 seconds. The sample was deformed by hand immediately after it was taken out of the hot water bath. With the load maintained on the deformed sample, it was quickly dipped in a cold water bath (20° C.) to fix the temporary shape. Shape recovery was accomplished by immersing the deformed sample back into the hot water bath. The shape recovery experiments for the other samples were attempted in the same fashion except the heating method. For samples 7, 8, 10, and 11, the corresponding temperatures of the hot water bath were 85, 75, 55, and 55° C., respectively. For sample 6, the heating was done in a hot oven at 110° C. and the heating time was 15 minutes.

All samples except sample 11 showed shape recovery property. Sample 11 lacks shape recovery capability due to the lack of crosslinker in its formulation. Nevertheless, sample 11 does reveal the lower limit of $T_g$ achievable with this particular SMP system.

Figure 11A:
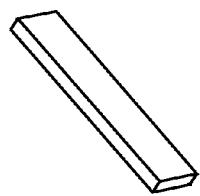
FIG. 11A illustrates the original rectangular shape of a sample according to one embodiment.
Figure 11B:
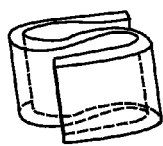
FIG. 11B illustrates the temporary deformed shape of a sample according to one embodiment.
Figure 11C:
FIG. 11C illustrates the temporary deformed shape of a sample according to one embodiment.
Figure 11D:
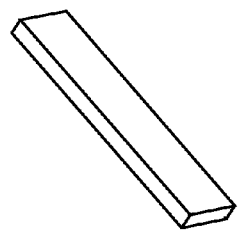
FIG. 11D illustrates the recovered rectangular shape of a sample according to one embodiment.

FIGS. 11A-D illustrate the shape change and recovery for sample 9. Starting from an original (permanent) rectangular shape (FIG. 11A), sample 9 was deformed into very complex shapes. Upon cooling under load, these temporary deformed shapes were fixed as shown in FIGS. 11B and 11C. Upon immersing in a 65° C. water bath, the temporary shapes both recovered to the original rectangular shape within about 6 seconds (FIG. 11D).

Numerous shaped memory polymers may be utilized in various embodiments of the invention. For example, staring with a typical aromatic diepoxy/diamine system with a $T_g$ of about 90° C., the aromatic epoxy component is replaced systematically with an aliphatic diepoxy to yield a series of epoxy shape memory polymers with $T_g$'s ranging from 3° C. to 90° C.

In various embodiments, the components of a shape memory polymer may include a rigid epoxy, an epoxy chain extender, and a flexible epoxy. The range of possible crosslinking chemistries which may be used to achieve shape memory polymers may include aliphatic multi-amines, aromatic multi-amines, organic multi-carboxylic acid, anhydride, or catalytic (as in imidazole type) crosslinking reactions. There are many different ways to achieve the appropriate relationships between the molecular properties. For example, the shape memory polymer may include a rigid epoxy, an epoxy extender, and a crosslinking agent; or a rigid epoxy, a flexible crosslinking agent, and a flexible epoxy; or a rigid epoxy, a rigid crosslinking agent, and a flexible epoxy; or a rigid epoxy, a flexible epoxy, and a catalytic curing agent; or a rigid epoxy, a crosslinking agent, and a diluent; or a flexible epoxy, a crosslinking agent, and a diluent; or a rigid epoxy and a flexible crosslinking agent; or a flexible epoxy and a catalytic curing agent; or a flexible epoxy and a crosslinking agent; and wherein the rigid epoxy is an aromatic epoxy having at least two epoxide groups, the flexible epoxy is an aliphatic epoxy having at least two epoxide groups, the epoxy extender has one epoxide group, the crosslinking agent is one of a multi-amine, an organic multi-carboxylic acid, or an anhydride, and the diluent is a monoamine or a mono-carboxylic acid. The components of the shape memory polymer composition may be present in an amount sufficient to provide, upon curing of the composition, an epoxy shape memory polymer having a change in storage modulus of 2 to 3 orders of magnitude before and after its glass transition. In various embodiments, the catalytic curing agent (or catalytic cure) promotes epoxy-to-epoxy or epoxy-to-hydroxyl reactions. The catalytic curing agent may include, but is not limited to, tertiary amines, amine salts, boron trifluoride complexes, or amine borates. In one embodiment, the shape memory polymer may have a glass transition temperature $T_g$ ranging from 25 to 200° C.

The above description of embodiments of the invention is merely exemplary in nature and, thus, variations thereof are not to be regarded as a departure from the spirit and scope of the invention.

What is claimed is:

1. An epoxy shape memory polymer composition comprising:
    a rigid epoxy;
    a flexible epoxy; and
    at least one of a crosslinking agent or a catalytic curing agent;
    wherein the rigid epoxy is an aromatic epoxy having at least two epoxide groups, the flexible epoxy is an aliphatic epoxy having at least two epoxide groups, and the crosslinking agent is one of a multi-amine, an organic multi-carboxylic acid, or an anhydride; and
    wherein the components are present in an amount sufficient to provide, upon curing of the composition, an epoxy shape memory polymer having a change in storage modulus of 2 to 3 orders of magnitude before and after its glass transition, and a glass transition temperature below 100° C. wherein the total molar amount of aromatic epoxy plus aliphatic epoxy is about twice the total molar amount of cross-linking agent.

2. An epoxy shape memory polymer composition as set forth in claim 1 further comprising an epoxy extender having one epoxide group.

3. An epoxy shape memory polymer composition as set forth in claim 1 further comprising a diluent, wherein the diluent is a monoamine or a monocarboxylic acid.

4. An epoxy shape memory polymer composition as set forth in claim 1 comprising an aromatic diepoxy, an aliphatic diepoxy, and a diamine.

5. An epoxy shape memory polymer composition as set forth in claim 4 wherein the total molar amount of aromatic epoxy plus aliphatic epoxy is about twice the total molar amount of diamines.

6. An epoxy shape memory polymer composition as set forth in claim 1 wherein the aromatic epoxy is diglycidyl ether of bisphenol A epoxy monomer with an approximate epoxy equivalent weight of 180.

7. An epoxy shape memory polymer composition as set forth in claim 1 wherein the aliphatic diepoxy is neopentyl glycol diglycidyl ether.

8. An epoxy shape memory polymer composition as set forth in claim 4 wherein the diamine is poly(propylene glycol)bis(2-aminopropyl) ether with an average molecular weight of about 230.

9. An epoxy shape memory polymer composition as set forth in claim 3 wherein the diluent is decylamine.

10. An epoxy shape memory polymer composition as set forth in claim 3 comprising an aromatic diepoxy, a diamine, and a monoamine.

11. An epoxy shape memory polymer composition as set forth in claim 1 wherein the aromatic epoxy is an aromatic diepoxy.

12. An epoxy shape memory polymer composition as set forth in claim 1 wherein the aliphatic epoxy is an aliphatic diepoxy.

13. An epoxy shape memory polymer composition as set forth in claim 1 wherein the flexible epoxy has a molecular weight equal to or greater than 216.

14. A method comprising:
    producing a shape memory polymer from a composition of claim 1 including an aromatic diepoxy, a crosslinking agent, and a diluent comprising:
    heating a first amount of the aromatic diepoxy;
    adding a second amount of the crosslinking agent and a third amount of the diluent to the aromatic epoxy to form a mixture; and
    thermally curing the mixture.

15. A method as set forth in claim 14 wherein the aromatic epoxy is diglycidyl ether of bisphenol A epoxy monomer, the crosslinking agent is poly(propylene glycol)bis(2-aminopropyl)ether, and the diluent is decylamine.

16. A method as set forth in claim 14 wherein the heating comprises melting at about 75° C. for about 0.5 hour.

17. A method as set forth in claim 14 wherein the thermal curing comprises curing at about 100° C. for about 16 hours.

18. A method comprising;
    producing a shape memory polymer from a composition of claim 1 including an aromatic epoxy, an aliphatic epoxy, and a crosslinking agent, comprising:
    heating a first amount of the aromatic epoxy;
    adding a second amount of the crosslinking agent and a third amount of the aliphatic epoxy to the aromatic epoxy to form a mixture; and
    thermally curing the mixture.

19. A method as set forth in claim 18 wherein the aromatic epoxy is diglycidyl ether of bisphenol A epoxy monomer, the aliphatic epoxy is NDGE, and the crosslinking agent is propylene glycol)bis(2-aminopropyl) ether.

20. An epoxy shape memory polymer comprising:
    a reaction product of a rigid epoxy, a flexible epoxy, and a crosslinking agent;
    wherein the rigid epoxy is an aromatic epoxy having at least two epoxide groups, the flexible epoxy is an aliphatic epoxy having at least two epoxide groups, and the crosslinking agent is a diamine;

wherein the aromatic epoxy, the aliphatic epoxy, and the crosslinking agent are present in an amount that provides a total molar amount of aromatic epoxy plus aliphatic epoxy is about twice a total molar amount of diamines;

wherein the epoxy shape memory polymer has a glass transition temperature below 100° C. and a narrowness of the glass transition about 7° C. or less; and wherein the epoxy shape memory polymer has a change in storage modulus of 2 or 3 orders of magnitude before and after its glass transition.

21. An epoxy shape memory polymer as set forth in claim 20 wherein the aromatic epoxy is diglycidyl ether of bisphenol A epoxy monomer with an approximate epoxy equivalent weight of 180.

22. An epoxy shape memory polymer as set forth in claim 20 wherein the aliphatic diepoxy is neopentyl glycol diglycidyl ether.

23. An epoxy shape memory polymer as set forth in claim 20 wherein the crosslinking agent is poly(propylene glycol) bis(2-aminopropyl) ether with an average molecular weight of about 230.

24. An epoxy shape memory polymer as set forth in claim 20 further comprising an epoxy extender having one epoxide group.

* * * * *